(12) United States Patent
Jeon

(10) Patent No.: US 10,804,513 B2
(45) Date of Patent: Oct. 13, 2020

(54) MANUAL SERVICE DISCONNECT FOR BATTERY SYSTEM

(71) Applicant: Samsung SDI Co., Ltd., Yongin-si, Gyeonggi-do (KR)

(72) Inventor: Doo Sung Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/475,645

(22) PCT Filed: Oct. 24, 2017

(86) PCT No.: PCT/KR2017/011764
§ 371 (c)(1),
(2) Date: Jul. 2, 2019

(87) PCT Pub. No.: WO2018/135724
PCT Pub. Date: Jul. 26, 2018

(65) Prior Publication Data
US 2019/0372070 A1 Dec. 5, 2019

(30) Foreign Application Priority Data
Jan. 18, 2017 (KR) .......................... 10-2017-0008672

(51) Int. Cl.
*H01M 2/10* (2006.01)
*H01R 13/52* (2006.01)
*H01R 13/648* (2006.01)
(52) U.S. Cl.
CPC ...... *H01M 2/1083* (2013.01); *H01R 13/5202* (2013.01); *H01R 13/648* (2013.01); *H01M 2220/20* (2013.01)

(58) Field of Classification Search
CPC ............ H01M 2/1083; H01M 2220/20; H01R 13/5202; H01R 13/648
(Continued)

(56) References Cited

U.S. PATENT DOCUMENTS 7,661,961 B2 * 2/2010 Brinkhous ............. B62K 5/025
439/35
7,708,578 B1 * 5/2010 Lenox ................ H01R 13/6315
439/248
(Continued)

FOREIGN PATENT DOCUMENTS

| CN | 2829170 Y | 10/2006 |
|---|---|---|
| JP | 3523025 B2 | 4/2004 |

(Continued)

OTHER PUBLICATIONS

Mettex; "Flexible Busbars; Busbar Connectors & Busbar Protection"; http://mettex.com/products/flexible-busbar; 2017; 1 pg.
(Continued)

*Primary Examiner* — Harshad C Patel
(74) *Attorney, Agent, or Firm* — Lewis Roca Rothgerber Christie LLP

(57) ABSTRACT

Disclosed is a manual service disconnection device for a battery system, comprising: a service plug unit; a disconnection header unit which is attachably and detachably coupled to the service plug unit and is mounted in the battery system; and a flexible bus line having one end coupled to one surface of an insertion part of the disconnection header unit, which is inserted inside the battery system, and the other end coupled to a bus line coupling terminal inside the battery system so as to electrically connect the manual service disconnection device with the battery system, and having flexibility to be bendable.

7 Claims, 4 Drawing Sheets

(58) Field of Classification Search
USPC .......................................................... 439/587
See application file for complete search history.

(56) References Cited

U.S. PATENT DOCUMENTS

| | | | | |
|---|---|---|---|---|
| 9,147,952 | B2* | 9/2015 | Kikuchi | H01R 12/7082 |
| 9,331,409 | B2* | 5/2016 | Naganuma | H01R 13/6315 |
| 9,509,096 | B2 | 11/2016 | Zhao et al. | |
| 10,003,157 | B2 | 6/2018 | Yeon | |
| 2014/0193990 | A1* | 7/2014 | Zhao | H01R 13/688 439/160 |
| 2015/0024629 | A1* | 1/2015 | Snader | H01R 13/5219 439/607.01 |
| 2015/0188117 | A1* | 7/2015 | Kim | H01M 2/305 439/762 |
| 2015/0229055 | A1* | 8/2015 | Fukushima | H01R 13/6315 439/733.1 |
| 2015/0311639 | A1* | 10/2015 | Neureiter | B60K 1/00 310/71 |
| 2016/0233004 | A1* | 8/2016 | Kroulik | B60L 50/50 |
| 2017/0047681 | A1* | 2/2017 | Yeon | H01R 13/5202 |

FOREIGN PATENT DOCUMENTS

| | | |
|---|---|---|
| JP | 2012-126267 A | 7/2012 |
| JP | 2015-170589 A | 9/2015 |
| KR | 10-0946579 B1 | 3/2010 |
| KR | 10-2015-0101154 A | 9/2015 |
| KR | 10-2015-0104603 A | 9/2015 |
| KR | 10-2015-0118338 A | 10/2015 |
| KR | 10-2016-0060685 A | 5/2016 |
| WO | WO 2015/160037 A1 | 10/2015 |

OTHER PUBLICATIONS

Chinese Patent Office Action for corresponding Chinese Patent Application No. 201780083786.X, dated Apr. 7, 2020, 7 pages.

* cited by examiner

MANUAL SERVICE DISCONNECT FOR BATTERY SYSTEM

CROSS-REFERENCE TO RELATED APPLICATION(S)

This application is a National Phase Patent Application of International Patent Application Number PCT/KR2017/011764, filed on Oct. 24, 2017, which claims priority of Korean Patent Application No. 10-2017-0008672, filed Jan. 18, 2017. The entire contents of both of which are incorporated herein by reference.

TECHNICAL FIELD

The present invention relates to a battery system, and more particularly, to a manual service disconnect for a battery system.

BACKGROUND ART

In general, an electric car or an electric vehicle (EV) uses an electric battery and an electric motor, instead of oil fuel and an engine. In order to safely manage and handle a high-voltage battery or a high-capacity battery for use in electric cars, hybrid vehicles, etc., safety measures need to be taken by an electrically controlling method and a physical method. Among safety devices, a power cutting-off system for an electric car is a manual service disconnect (MSD), which is a system capable of selectively cutting off battery power to be supplied to an electric car according to the physical method, and is commercially available in various trade names including, for example, a safety plug, a service plug, and a disconnect switch, according to their manufacturers.

The MSD is used to prevent safety-related accidents from occurring during the manufacture, assembly, repair, delivery, etc. of an electric car. In this connection, the MSD should be configured in such a manner that a user can easily cut off battery power. In addition, when the MSD is assembled, it needs to be hermetically sealed. Moreover, when the MSD is attached to the high-voltage battery, it is necessary to reduce an inner space of an external casing occupied by the MSD.

Technical Problems to be Solved

Embodiments of the present invention provide a manual service disconnect (MSD), which can be inserted into the battery system even when an internal space of an external casing is insufficient.

Embodiments of the present invention also provide a manual service disconnect (MSD), which can be flexibly coupled to the battery system when the MSD is attached/detached to/from the battery system.

Embodiments of the present invention also provide a manual service disconnect (MSD), which can be easily assembled and has a water proofing function.

Technical Solutions

In accordance with an aspect of the present invention, the above and other objects can be accomplished by providing a manual service disconnect (MSD) for a battery system, including a service plug unit, a disconnection header unit which is attachably and detachably coupled to the service plug unit and is mounted in the battery system, and a flexible bus line having one end coupled to one surface of an insertion part of the disconnection header unit, which is inserted inside the battery system, and the other end coupled to a bus line coupling terminal inside the battery system so as to electrically connect the MSD with the battery system, and the flexible bus line having flexibility to be bendable.

The disconnection header unit may include a stopper protrusion outwardly protruding from a side surface of the disconnection header unit to prevent the MSD from being inserted into the battery system to more than a predetermined depth, and an insertion part configured to protrude downwardly to the stopper protrusion so as to be inserted into the battery system.

The stopper protrusion may include a groove located along the periphery of the side surface of the insertion part in its bottom surface, and a waterproofing sealing ring may further be located to be hung on the groove.

The disconnection header unit may include a coupling terminal to be electrically coupled to the battery system on a surface outwardly exposed from one surface of the insertion part, and the flexible bus line may be electrically connected to the coupling terminal.

The flexible bus line may include a coupling hole located at one end so as to be coupled to the coupling terminal using a bolt.

The other end of the flexible bus line may be coupled to a bus line coupling terminal of the battery system through bolt engagement, and the flexible bus line may have a length greater than an insertion depth in which the MSD is inserted into the battery system.

The flexible bus line may be comprised of a pair of flexible bus lines, and a short-circuit preventing unit may further be provided in the flexible bus line to fix the one end of each of the pair of flexible bus lines so as to allow the flexible bus lines to be spaced apart from each other.

The short-circuit preventing unit may further include a fixing part for preventing the flexible bus line from being rotated when the bolt is coupled to either end of the short-circuit preventing unit.

The bolt may sequentially penetrate the short-circuit preventing unit and the flexible bus line to then be coupled to the coupling terminal of the MSD.

The flexible bus line may be bent at a portion between the one end and the other end at least one time, so that one end and the other end face each other while being spaced apart from each other.

The flexible bus line may be a bus line shaped of a mesh bar.

Advantageous Effects

As described above, since the MSD according to an embodiment of the present invention can be easily inserted inside the battery system using a flexible bus line shaped of a mesh bar, which is folded when the MSD is attached to the battery system, even if the inner space of the external casing is insufficient, the size of the battery system can be reduced.

In addition, since the MSD according to an embodiment of the present invention can perform internal operations by being taken out from the battery system using a flexible bus line shaped of a mesh bar without disconnecting the bus line, operational flexibility can be provided.

In addition, since the MSD according to an embodiment of the present invention can be easily assembled and disassembled to/from the battery system and has a waterproofing function without a separate waterproofing unit, an assembling time can be shortened while providing safety.

BEST MODE FOR CARRYING OUT THE INVENTION

Figure 1:
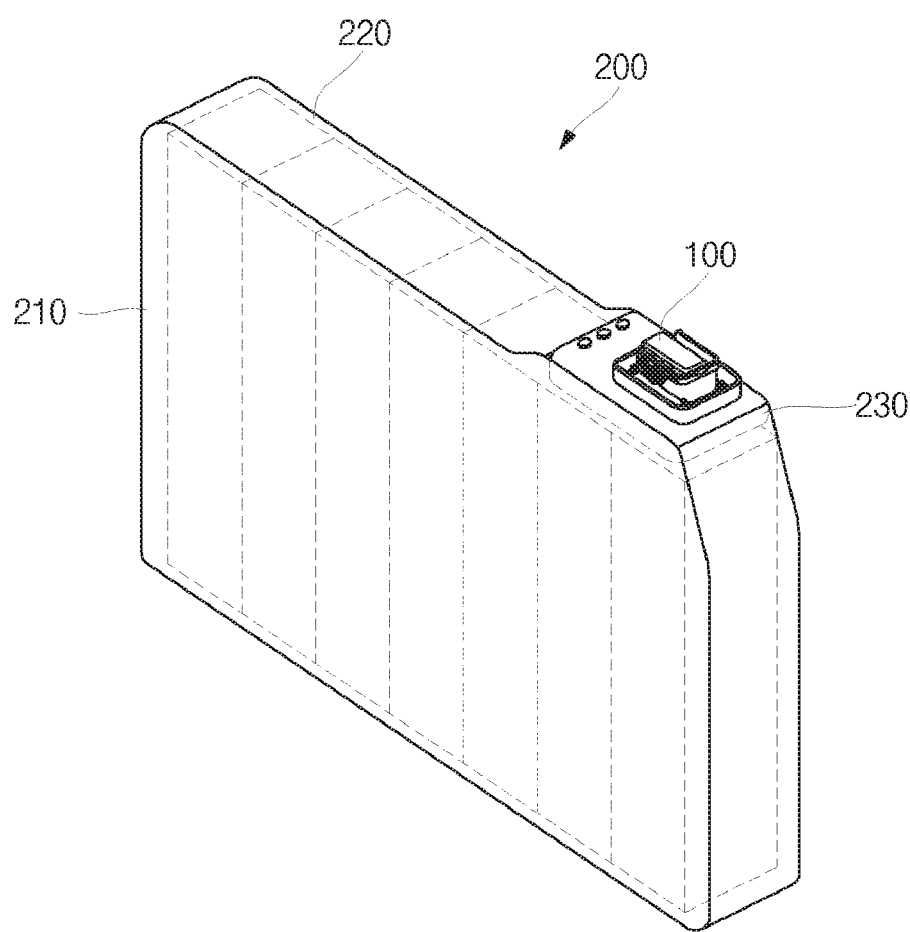
FIG. 1 is a perspective view of a battery system including a manual service disconnect (MSD) according to an embodiment of the present invention.

Hereinafter, a preferred embodiment of the present invention will be described in detail.

Various embodiments of the present invention may be embodied in many different forms and should not be construed as being limited to the example embodiments set forth herein. Rather, these example embodiments of the disclosure are provided so that this disclosure will be thorough and complete and will convey inventive concepts of the disclosure to those skilled in the art.

In the accompanying drawings, sizes or thicknesses of various components are exaggerated for brevity and clarity. Like numbers refer to like elements throughout. As used herein, the term "and/or" includes any and all combinations of one or more of the associated listed items. In addition, it will be understood that when an element A is referred to as being "connected to" an element B, the element A can be directly connected to the element B or an intervening element C may be present and the element A and the element B are indirectly connected to each other.

The terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprise or include" and/or "comprising or including," when used in this specification, specify the presence of stated features, numbers, steps, operations, elements, and/or components, but do not preclude the presence or addition of one or more other features, numbers, steps, operations, elements, components, and/or groups thereof.

It will be understood that, although the terms first, second, etc. may be used herein to describe various members, elements, regions, layers and/or sections, these members, elements, regions, layers and/or sections should not be limited by these terms. These terms are only used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

Figure 2:
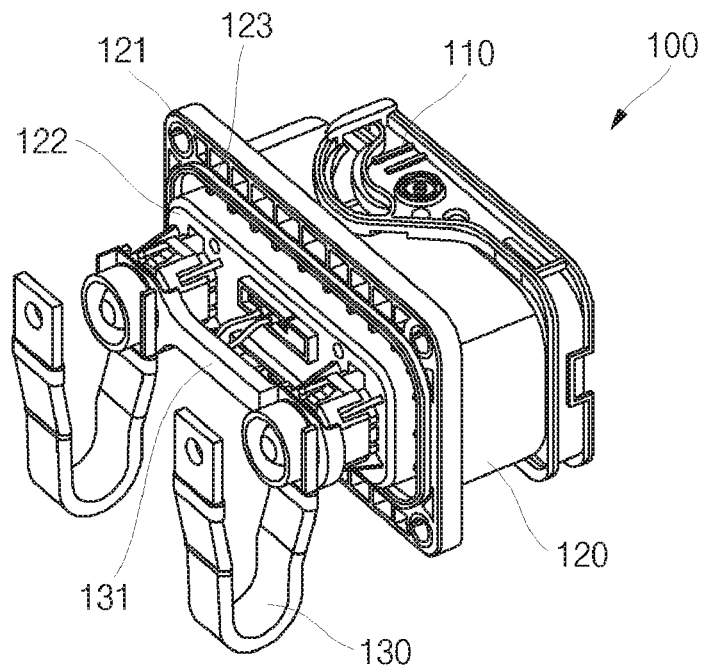
FIG. 2 is an enlarged perspective view of the MSD shown in FIG. 1.
Figure 3:
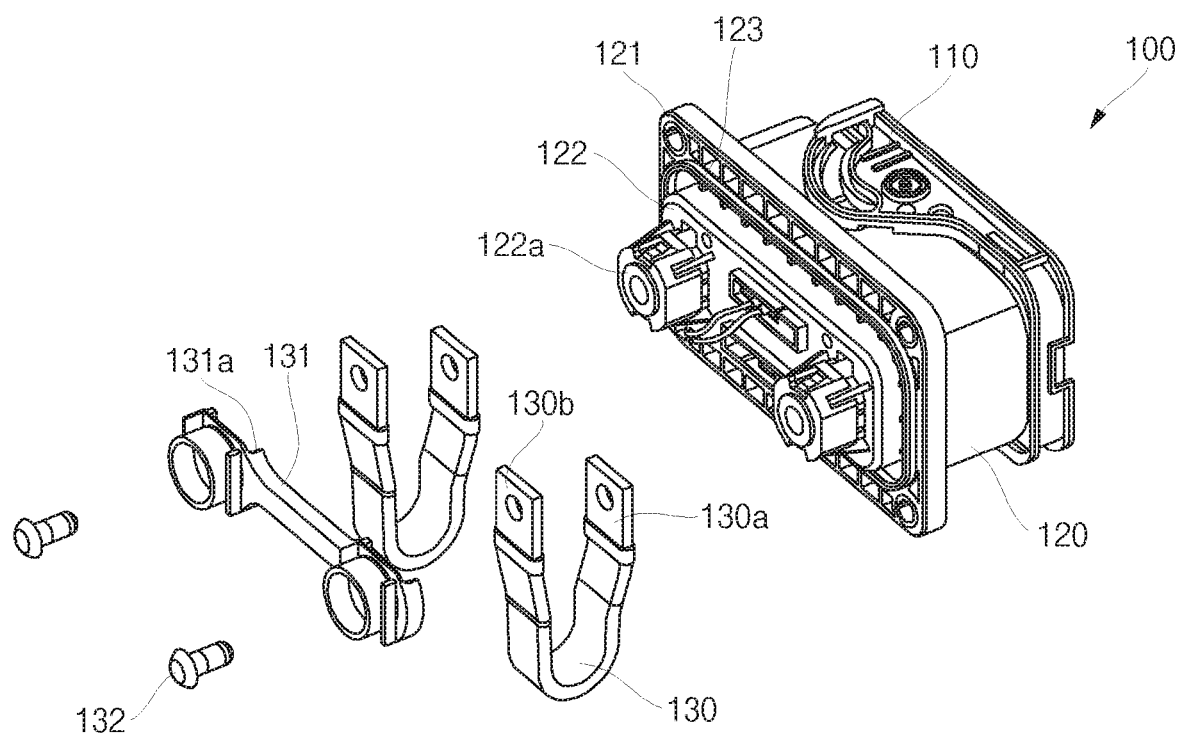
FIG. 3 is an exploded perspective view of flexible bus lines taken from the MSD shown in FIG. 2.
Figure 4A:
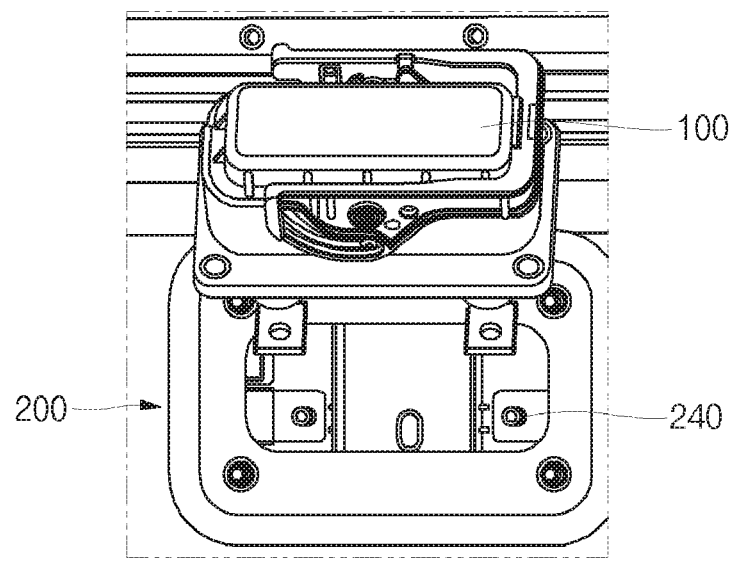
FIGS. 4A to 4C are enlarged views before and after the MSD shown in FIG. 1 is assembled with a battery system.
Figure 4B:
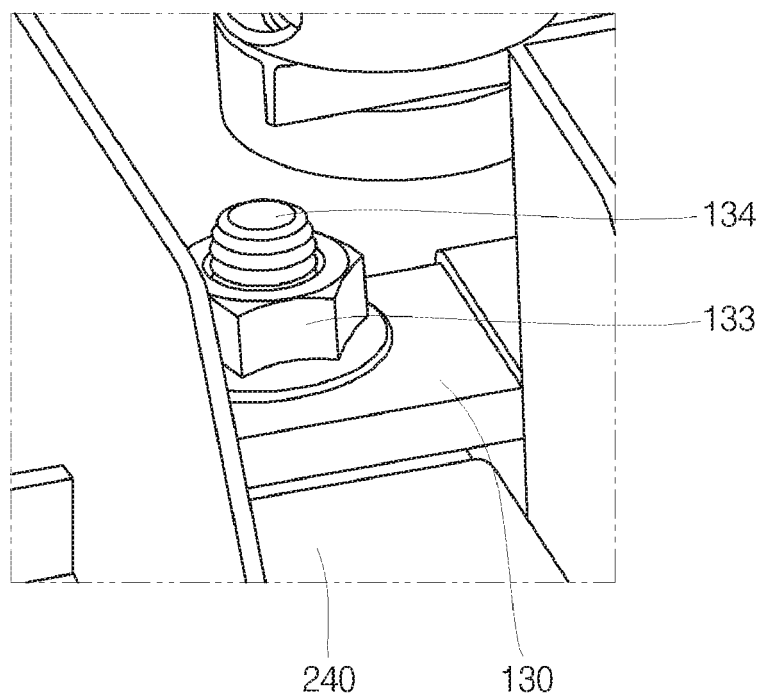
Figure 4C:
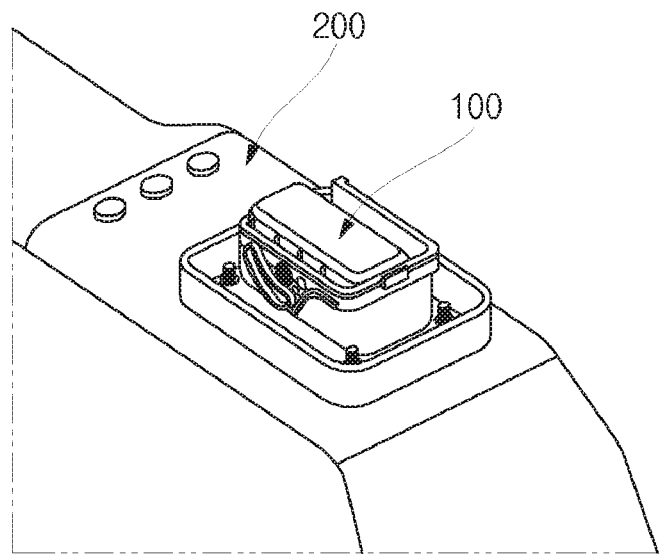
Figure 5:
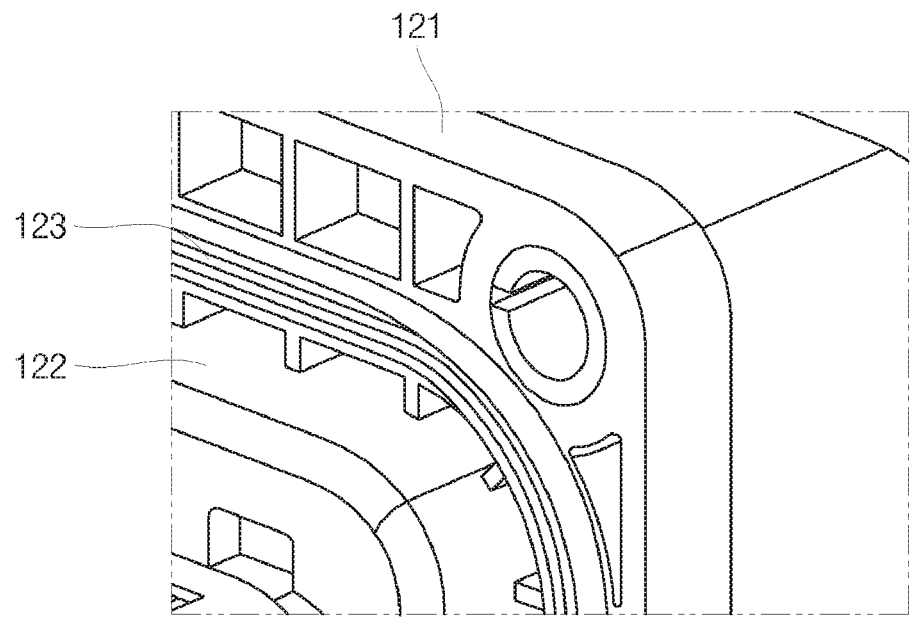
FIG. 5 is an enlarged view illustrating a side surface of an insertion part of the MSD shown in FIG. 1.

Referring to FIG. 1, a perspective view of a battery system including a manual service disconnect (MSD) according to an embodiment of the present invention is illustrated. Referring to FIG. 2, an enlarged perspective view of the MSD shown in FIG. 1 is illustrated. Referring to FIG. 3, an exploded perspective view of flexible bus lines taken from the MSD shown in FIG. 2 is illustrated. Referring to FIGS. 4A to 4C, enlarged views before and after the MSD shown in FIG. 1 is assembled with a battery system are illustrated. Referring to FIG. 5, an enlarged view illustrating a side surface of an insertion part of the MSD shown in FIG. 1 is illustrated. Hereinafter, the manual service disconnect (MSD) 100 and the battery system 200 will be described with reference to FIGS. 1 to 5.

First, the battery system 200 includes a battery pack 210, an external casing 220 receiving the battery pack 210, a battery distribution unit (BDU) 230 electrically connected to the battery pack 210, and a manual service disconnect (MSD) 100 mounted in the external casing 220.

The battery pack 210 includes multiple battery cells connected to one another in series or in parallel. The battery pack 210 is a component of a high-voltage energy storage system. For example, the battery pack 210 can be used in application examples of automobiles, such as components of electric vehicles or hybrid electric vehicles.

The multiple battery cells that make up the battery pack 210 may be arbitrary types of battery cells each configured such that a positive electrode plate, a separator and a negative electrode plate are stacked or wound. For example, the battery cell may be one of a pouch-type battery cell, a circular battery cell and a prismatic battery cell, but aspects of the present invention are not limited thereto. The battery pack 210 may be accommodated in an inner space of the external casing 220.

The BDU 230 may be electrically connected to the battery pack 210 and may be mounted inside the external casing 220, as shown in FIG. 1. In addition, the BDU 230 may also be mounted outside the external casing 220, and the present invention does not limit the location of the BDU 230 to those disclosed herein.

The BDU 230 is used in managing power capacity and functions of the battery system 200 by measuring current of the battery pack 210 and adjusting power distribution. The BDU 230 may monitor and control operations of various components of the battery system 200.

The BDU 230 may evaluate battery integrity of the battery pack 210 or may operate responsive to the battery integrity. In addition, the BDU 230 may evaluate a battery state of the battery pack 210 or may operate responsive to the battery state. Moreover, the BDU 230 may monitor over-voltage and/or low voltage conditions or may operate responsive to the over-voltage and/or low voltage conditions. Additionally, the BDU 230 may manage charging functions of the battery pack 210.

The MSD 100 may be fixed and coupled to the external casing 220. Alternatively, the MSD 100 may be mounted on another structure in proximity to the battery pack 210. In addition, the MSD 100 may be electrically connected to the BDU 230.

As shown in FIGS. 2 and 3, the MSD 100 includes a service plug unit 110 and a disconnection header unit 120. The MSD 100 may further include a flexible bus line 130 to be electrically connected to the battery system 200.

The service plug unit 110 is inserted into the disconnection header unit 120 to be mounted in the MSD 100 and can be detached from the disconnection header unit 120. That is to say, the service plug unit 110 may be detachably mounted in the disconnection header unit 120. In addition, the MSD 100 may connect battery power when mounting of the service plug unit 110 in the disconnection header unit 120 is completed, and may cut off power supply by detaching the service plug unit 110 away from the disconnection header unit 120. The service plug unit 110 may include a lever housing, a rotatable lever, a terminal housing, a service plug unit sealing member, a shielding member and an interlock terminal, but aspects of the present invention are not limited thereto. When the service plug unit 110 is mounted in the disconnection header unit 120, the interlock terminal of the service plug unit 110 may be brought into contact with an interlock terminal provided in the disconnection header unit 120 to then be coupled thereto, thereby maintaining an electrically connected state. If the service plug unit 110 is detached from the disconnection header unit 120, the interlock terminal of the service plug unit 110 and the interlock terminal provided in the disconnection header unit 120 are electrically disconnected, thereby cutting off a high voltage of the battery system 200.

The MSD 100 can be used for any device other than the battery system 200 so long as the device requires current interruption by connecting/disconnecting the service plug unit 110 to/from the disconnection header unit 120.

The disconnection header unit 120 is fixedly coupled to the battery system 200 and is electrically connected to the battery system 200 through the flexible bus line 130. The disconnection header unit 120 may be electrically connected the battery pack 210 when the service plug unit 110 is completely mounted in the battery system 200, and may cut off power when the service plug unit 110 is detached away from the disconnection header unit 120.

The disconnection header unit 120 includes a stopper protrusion 121 that outwardly protrudes from a side surface of the disconnection header unit 120. The stopper protrusion 121 may serve as a stopper to prevent the MSD 100 from being inserted into the battery system to more than a predetermined depth when a given portion of the stopper protrusion 121 is inserted into the external casing 220 of the battery system 200. As shown in FIGS. 2 and 3, the stopper protrusion 121 may be shaped of a rectangle protruding along the side surface of the rectangular disconnection header unit 120 and may have a circular or oval cross-section, but not limited to those disclosed herein. In addition, the stopper protrusion 121 may be formed in the form of a protrusion protruding only on a portion of the side surface of the disconnection header unit 120.

In addition, the disconnection header unit 120 includes an insertion part 122 positioned below the stopper protrusion 121. The insertion part 122 is a part inserted into the external casing 220 of the battery system 200, and the flexible bus line 130 is electrically coupled to one surface of the insertion part 122.

In addition, a groove (not shown) is located along the periphery of the side surface of the insertion part 122 in the bottom surface of the stopper protrusion 121, and a waterproofing sealing ring 123 is further located to be inserted into the groove. The waterproofing sealing ring 123 may prevent moisture from infiltrating into the battery system 200 by allowing the bottom surface of the insertion part 122 of the disconnection header unit 120 to make close contact with the external casing 220 of the battery system 200 when the disconnection header unit 120 is fixedly assembled to the external casing 220. That is to say, since the waterproofing sealing ring 123 is positioned between the disconnection header unit 120 and the external casing 220, the disconnection header unit 120 and the external casing 220 are brought into close contact with each other, thereby sealing the external casing 220.

The flexible bus line 130 may have one end 130*a* attached and coupled to one surface of the disconnection header unit 120 and the other end 130*b* coupled to a bus line coupling terminal 240 inside the battery system 200 so as to electrically connect the MSD 100 with the battery system 200. Here, the bus line coupling terminal 240 may be exposed from the battery system 200 through an insertion hole of the external casing 220.

The flexible bus line 130 may be bent at a portion between the one end 130*a* and the other end 130*b* at least one time, so that the one end 130*a* and the other end 130*b* face each other while being spaced apart from each other. The flexible bus line 130 may have flexibility to be bendable and may be a bus line shaped of a mesh bar. The flexible bus line 130 is suitably used at a narrow space where cables are not connectable. That is to say, even in a case where the external casing 220 of the battery system 200 has a narrow inner space, the flexible bus line 130 can maintain an electrically connected state by electrically connecting the battery system 200 and the MSD 100 and then inserting the insertion part 122 of the MSD 100 into the battery system 200. Since the flexible bus line 130 has bendability and flexibility, demand for a separate part due to interference between parts may not arise and a smaller, thinner bus line than a general cable bus line can be achieved, thereby improving operational efficiency and increasing space utilization efficiency.

As shown in FIG. 3, the disconnection header unit 120 includes coupling terminals 122*a* located on the bottom surface of the insertion part 122 to be electrically coupled to the battery system 200. Each of the coupling terminals 122*a* is coupled to the one end 130*a* of the flexible bus line 130 using a coupling element, such as, for example, a bolt 132. The one end 130*a* of the flexible bus line 130 having a coupling hole allowing the bolt 132 to pass to then be coupled thereto. In addition, a coupling groove to be coupled to the bolt 132 is provided at the coupling terminal 122*a*.

The flexible bus line 130 is generally comprised of a pair of flexible bus lines, and a short-circuit preventing unit 131 is further provided in the flexible bus line 130. The short-circuit preventing unit 131 fixes the one end 130*a* of each of the pair of flexible bus lines 130 so as to allow the flexible bus lines 130 to be spaced apart from each other to prevent the respective flexible bus lines 130 from being short-circuited to each other.

As shown in FIGS. 2 and 3, the short-circuit preventing unit 131 includes a coupling groove located at either end to allow the bolt 132 to be coupled thereto and has a length corresponding to a distance between the coupling terminals 122*a* of the MSD 100. In addition, the short-circuit preventing unit 131 includes a fixing part 131*a* for preventing the one end 130*a* of the flexible bus line 130 from being rotated. The one end 130*a* of the flexible bus line 130 is inserted into the fixing part 131*a* of the short-circuit preventing unit 131, thereby preventing the flexible bus line 130 from being rotated when the flexible bus line 130 and the MSD 100 are coupled to each other using the bolt 132.

The short-circuit preventing unit 131 is preferably made of an insulating material, such as plastic or rubber. Referring to FIG. 3, the bolt 132 may function to fix the short-circuit preventing unit 131 and the flexible bus line 130 to the coupling terminal 122a of the MSD 100 to electrically couple the flexible bus line 130 and the disconnection header unit 120. The bolt 132 sequentially penetrates the short-circuit preventing unit 131 and the flexible bus line 130 to then be coupled to the coupling terminal 122a of the MSD 100. In addition, the bolt 132 and the short-circuit preventing unit 131 make the respective flexible bus lines 130 spaced apart from each other so as not to be short-circuited during operations or assembling processes.

Referring to FIG. 4A, in a state in which the one end 130a of the flexible bus line 130 is electrically coupled to the coupling terminal 122a, the MSD 100 is brought in an insertion hole of the battery system 200 to couple the other end 130b of the flexible bus line 130 to the bus line coupling terminal 240 of the battery system 200. Next, as shown in FIG. 4B, the other end 130b of the flexible bus line 130 is fixed to the bus line coupling terminal 240 using coupling elements, such as, for example, a bolt 134 and a nut 133. Then, the flexible bus line 130 may electrically connect the battery system 200 and the MSD 100. Here, the flexible bus line 130 may have a length greater than an insertion depth in which the MSD 100 is inserted into the battery system 200. After the flexible bus line 130 and the battery system 200 are combined, as shown in FIG. 4C, the MSD 100 is assembled with the battery system 200 by inserting the insertion part 122 into the insertion hole of the battery system 200. Here, the flexible bus line 130 is folded within the inner space of the battery system 200.

Accordingly, the MSD 100 and the flexible bus line 130 can be inserted inside the battery system 200 even when the inner space of the external casing 220 of the battery system 200 is narrow. In addition, even if the flexible bus line 130 is not completely separated from the battery system 200, the battery system 200 can be inspected and can perform operations.

As described above, the MSD 100 according to an embodiment of the present invention can be easily inserted inside the battery system 200 using the flexible bus line 130 shaped of a mesh bar, which is folded when the MSD 10o is attached to the battery system 200, even if the inner space of the external casing 220 is insufficient, thereby reducing the size of the battery system 200.

In addition, the MSD 100 according to an embodiment of the present invention can perform internal operations by being taken out from the battery system 200 using the flexible bus line 130 shaped of a mesh bar without disconnecting the bus line 130, thereby providing operational flexibility.

In addition, the MSD 100 according to an embodiment of the present invention can be easily assembled and disassembled to/from the battery system 200, thereby shortening an assembling time. In addition, the MSD 100 has a waterproofing function by the waterproofing sealing ring 123, thereby providing the battery system 200 having safety.

Although the manual service disconnect (MSD) according to an example embodiment of the present invention has been described, the example embodiment is set forth for illustrative purposes and do not serve to limit the invention. Those skilled in the art will readily appreciate that many modifications and variations can be made, without departing from the spirit and scope of the invention as defined in the appended claims, and such modifications and variations are encompassed within the scope and spirit of the present invention.

INDUSTRIAL APPLICABILITY

The present invention relates to a battery system, and more particularly, to a manual service disconnect (MSD) for the battery system.

The invention claimed is:

1. A manual service disconnect (MSD) for a battery system, comprising:
 a service plug unit;
 a disconnection header unit which is attachably and detachably coupled to the service plug unit and is mounted in the battery system; and
 a flexible bus line having one end coupled to one surface of an insertion part of the disconnection header unit, which is inserted inside the battery system in an insertion direction, and the other end coupled to a bus line coupling terminal inside the battery system so as to electrically connect the MSD with the battery system, and the flexible bus line having flexibility to be bendable,
 wherein the flexible bus line is bent at a portion between the one end and the other end at least one time, such that the one end and the other end face each other while being spaced apart from each other, the other end being spaced apart from the one end in the insertion direction,
 wherein the disconnection header unit comprises:
 a stopper protrusion outwardly protruding from a side surface of the disconnection header unit to prevent the MSD from being inserted into the battery system to more than a predetermined depth; and
 the insertion part configured to protrude downwardly to the stopper protrusion so as to be inserted into the battery system,
 wherein the disconnection header unit includes a coupling terminal to be electrically coupled to the battery system on a surface outwardly exposed from one surface of the insertion part, and the flexible bus line is electrically connected to the coupling terminal,
 wherein the flexible bus line includes a coupling hole located at the one end so as to be coupled to the coupling terminal using a bolt, and
 wherein the flexible bus line is comprised of a pair of flexible bus lines, and a short-circuit preventing unit is further provided in the flexible bus line to fix the one end of each of the pair of flexible bus lines so as to allow the flexible bus lines to be spaced apart from each other.

2. The MSD of claim 1, wherein the stopper protrusion comprises a groove located along the periphery of the side surface of the insertion part in its bottom surface, and a waterproofing sealing ring is further located to be hung on the groove.

3. The MSD of claim 1, wherein the other end of the flexible bus line is coupled to the bus line coupling terminal of the battery system through bolt engagement, and the flexible bus line has a length greater than an insertion depth in which the MSD is inserted into the battery system.

4. The MSD of claim 1, wherein the flexible bus line is a bus line shaped of a mesh bar.

5. A manual service disconnect (MSD) for a battery system, comprising:
 a service plug unit;

a disconnection header unit which is attachably and detachably coupled to the service plug unit and is mounted in the battery system; and a flexible bus line having one end coupled to one surface of an insertion part of the disconnection header unit, which is inserted inside the battery system, and the other end coupled to a bus line coupling terminal inside the battery system so as to electrically connect the MSD with the battery system, and the flexible bus line having flexibility to be bendable, wherein the disconnection header unit comprises:

a stopper protrusion outwardly protruding from a side surface of the disconnection header unit to prevent the MSD from being inserted into the battery system to more than a predetermined depth; and the insertion part configured to protrude downwardly to the stopper protrusion so as to be inserted into the battery system, wherein the disconnection header unit includes a coupling terminal to be electrically coupled to the battery system on a surface outwardly exposed from one surface of the insertion part, and the flexible bus line is electrically connected to the coupling terminal, wherein the flexible bus line includes a coupling hole located at the one end so as to be coupled to the coupling terminal using a bolt, and wherein the flexible bus line is comprised of a pair of flexible bus lines, and a short-circuit preventing unit is further provided in the flexible bus line to fix the one end of each of the pair of flexible bus lines so as to allow the flexible bus lines to be spaced apart from each other.

6. The MSD of claim 5, wherein the short-circuit preventing unit further comprises a fixing part for preventing the flexible bus line from being rotated when the bolt is coupled to either end of the short-circuit preventing unit.

7. The MSD of claim 5, wherein the bolt sequentially penetrates the short-circuit preventing unit and the flexible bus line to then be coupled to the coupling terminal of the MSD.

* * * * *